United States Patent [19]

Tokumoto et al.

[11] Patent Number: 4,994,218
[45] Date of Patent: Feb. 19, 1991

[54] METHOD OF PRODUCING GELLED GREEN COMPACT FOR THIN SINTERED BODY

[75] Inventors: Junichi Tokumoto; Minato Ando; Takashi Katoh, all of Nagoya, Japan

[73] Assignee: NGK Spark Plug Co., Ltd., Nagoya, Japan

[21] Appl. No.: 373,055

[22] Filed: Jun. 28, 1989

[30] Foreign Application Priority Data

Jun. 30, 1988 [JP] Japan ............... 63-163400

[51] Int. Cl.$^5$ ............................. C04B 35/10
[52] U.S. Cl. ....................... 264/56; 501/12; 501/153
[58] Field of Search ............ 264/56; 501/12, 153

[56] References Cited

U.S. PATENT DOCUMENTS 4,608,215  8/1986  Gonczy et al. ............. 264/56
4,800,051  1/1989  Yan ........................ 501/12

FOREIGN PATENT DOCUMENTS 57-88074   6/1982  Japan .
59-102833  6/1984  Japan ................... 501/12

Primary Examiner—James Derrington
Attorney, Agent, or Firm—Foley & Lardner, Schwartz, Jeffery, Schwaab, Mack, Blumenthal & Evans

[57] ABSTRACT

A method of producing a gelled green compact for a thin sintered body is disclosed. The method comprises by steps (a) adding an acid to a solution of metal alkoxide to produce a sol which has the pH controlled within the range from approximately 2 to approximately 3; (b) adding an acid to the sol to lower the pH of the same; (c) adding an alkali to the sol to increase the pH of the same and control the pH within a range from approximately 1.5 to approximately 3; (d) drying the sol; and (e) molding the sol into a gelled green compact. The gelled green compact has a satisfied plasticity.

16 Claims, 1 Drawing Sheet

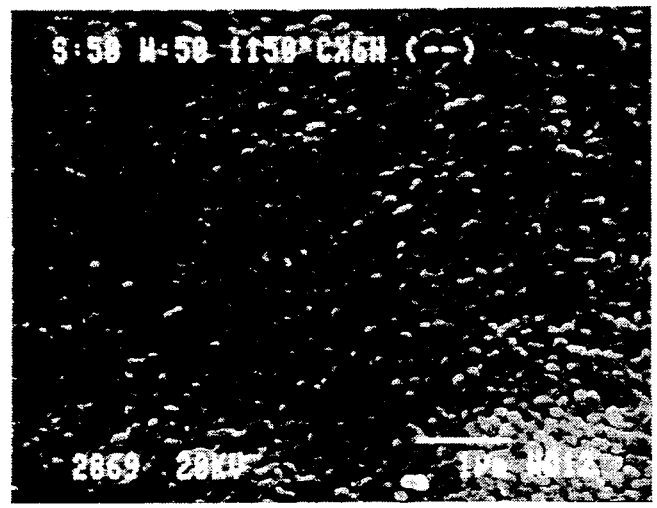

4,994,218

METHOD OF PRODUCING GELLED GREEN COMPACT FOR THIN SINTERED BODY

BACKGROUND OF THE INVENTION

1. Field of the Invention

The present invention relates in general to a method of producing a sintered body, and more particularly to a method of producing a gelled green compact which is suitable for producing a thin sintered body which is easily processed.

2. Description of the Prior Art

Hitherto, for producing a thin sintered body, various methods have been proposed and put into practical use. One of them is a method in which a solution of a metal alkoxide is hydrolyzed to coagulate a sol, and the sol is molded, dried and baked to produce a thin sintered body. Japanese Patent First Provisional Publication No. 57-88074 shows an example of such methods, in which a solution of aluminium aloxide is hydrolyzed to coagulate a sol, the sol is molded into a thin gelled green compact and the green compact is dried and baked to produce a thin alumina-sintered body.

The method, however, inherently has the drawbacks described below.

That is, the dried gelled green compact produced from the sol is very fragile, and thus it is difficult or at least troublesome to provide the green compact with a precise shape and dimension. In fact, hitherto, the green compact once shaped has been baked without being reshaped before the baking.

Usually, some organic binder and plasticizer are used for providing the green compact with a certain plasticity. However, the organic binder and plasticizer hitherto used tend to deteriorate the characteristic of the sintered body produced from such green compact. More specifically, such agents have bad effects on the density and homogeneity of the product, viz., sintered body.

SUMMARY OF THE INVENTION

It is therefore an object of the present invention to provide a method of producing a gelled green compact for a thin sintered body, which method is free of the above-mentioned drawbacks.

According to the present invention, there is provided a method of producing a gelled green compact for a thin sintered body, which green compact has a satisfied plasticity.

According to the present invention, there is provided a method of producing a gelled green compact for a thin sintered body, which method has a step of precisely controlling the pH (hydrogen ion exponent) of a sol from which the gelled green compact is molded.

According to the present invention, there is provided a method of producing a gelled green compact for a thin sintered body, which method has no step of using any organic binder for producing the gelled green compact.

According to the present invention, there is provided a method for producing a gelled green compact for a thin sintered body, which method comprises by steps (a) adding an acid to a solution of metal alkoxide to produce a sol which has the pH controlled within a range from approximately 2 to approximately 3; (b) adding an acid to the sol to lower the pH of the same; (c) adding an alkali to the sol to increase the pH of the same and control the pH within a range from approximately 1.5 to approximately 3; (d) drying the sol; and (e) molding the sol into a gelled green compact.

According to the present invention, there is further provided a method for producing a thin sintered body, which method comprises by steps: (a) adding aluminium isopropoxide to isopropyl alcohol keeping a total reflux of the alcohol at its boiling point thereby to produce a solution of metal alkoxide; (b) adding a solution of nitric acid to the metal alkoxide solution to hydrolyze the aluminium isopropoxide thereby to produce a sol; (c) cooling the sol and removing any remaining alcohol therefrom; (d) adding concentrated nitric acid to the sol to allow the same to have pH 2.0; (e) adding the concentrated nitric acid to the sol to lower the pH of the same to 1.4; (f) adding a concentrated ammonia solution to said sol to allow the same to have pH 2.0 again; (g) drying the sol; (h) molding the sol into a thin gelled green compact; and (i) baking the thin gelled green compact.

In order to solve the drawbacks encountered in the above-mentioned method, the inventors carried out various examinations and tests and finally discovered an effective method for producing a satisfied thin gelled green compact, which will be outlined in the following.

That is, in first step of the method, a sol is produced by hydrolyzing a solution of metal alkoxide with presence of an acid, and the sol is subjected to a pH control to have about pH 2 to about pH 3. In second step, an acid is added to the sol to lower the pH of the same. In third step, an alkali is added to the sol to increase the pH and control the same within a range from about pH 1.5 to about pH 3. In fourth step, the sol thus controlled in pH is molded into a wet gelled green compact and then the wet green compact is dried to produce a thin gelled green compact.

The dried thin green compact thus produced possesses a considerable plasticity. That is, the green compact can be bent by a certain degree and can be shaped like a film having a thickness of about 10 μm to 0.1 mm. The acids used in the first and second steps may be the same, and they may be nitric acid, hydrochloric acid and the like. However, there is no limitation in selecting the acid. That is, any type of acid can be used so long as the same can control the pH to the given degree. The alkali used in the third step may be of a type which can be removed from the green compact when dried. Preferably, aqueous solution of ammonia is used.

When, the sol in the first step has the pH lower than 2, the plasticity of the dried thin green compact produced in the fourth step is lowered, and when the sol has the pH higher than 3, the viscosity of the dried green compact is increased to such a degree as to make the thickness of the film uneven. The pH of the sol in the second step is controlled at least within a range from about 1.2 to about 1.6. When the sol in the third step has a pH lower than 1.5, the dried thin green compact produced in the fourth step has an undesired crystal deposited thereon causing eneven thickness of the film, and when the sol has a pH higher than 3, the dried thin green compact produced in the fourth step fails to have an even thickness therethroughout.

BRIEF DESCRIPTION OF SINGLE DRAWING

The single FIGURE is an electron microscope picture showing a surface of a sintered body which is produced by the present invention.

DETAILED DESCRIPTION OF THE INVENTION

In the following, the method of the present invention will be described in detail by explaining exemplified methods which were carried out by the inventors for producing improved sintered bodies.

EXAMPLES

In first step of the method, 0.2 mole of aluminium isopropoxide was added to a well stirred 6 mole of isopropyl alcohol keeping a total reflux of the alcohol at its boiling point. With this, a solution of metal alkoxide was prepared. Then, a solution of nitric acid which consists of 20 mole of water and $2.5 \times 10^{-5}$ mole of nitric acid was added dropwise to the metal alkoxide solution to hydrolyze the aluminium isopropoxide. With this, a sol was obtained. The sol was cooled while removing the remaining alcohol therefrom. Then, concentrated nitric acid was added to the sol to allow the same to have pH 2.0.

In second step, the concentrated nitric acid was further added to the sol to lower the pH of the same to pH 1.4.

In third step, the concentrated ammonia solution was added to the sol to allow the same to have pH 2.0 again.

In fourth step, the sol thus controlled in pH was put in a TEFLON (trade name)-coated vat having a size of 120 mm in length, 100 mm in width and 20 mm in depth. For drying the sol, the same along with the vat was put in a constant temperature oven and kept at 40° C. for two days and nights. Then, by using a known casting method, the sol was molded into a plurality of thin gelled green compacts, each having a size of 120 mm in length, 100 mm in width and 20 to 100 $\mu$m in thickness. Under this condition, the isopropyl alcohol and free water were completely removed from the green compacts.

Some of the thin green compacts were curved to have each a cylindrical shape, while the remaining compacts were kept flat. These cylindrical and flat compacts were put into an electric furnace and baked at 1100° C. for about 6 hours. The baking of the cylindrical green compacts was carried out by using certain supporters. With this baking, α-alumina sintered bodies having the same shapes as the corresponding green compacts were produced.

The attached single drawing shows an electron microscope picture ($\times 10,000$) of the sintered body. In this picture, the dark portions show fine pores and the semi-dark portions show crystal grains. It was revealed that the sintered bodies thus produced had no portions broken and kept the exact shapes of the corresponding green compacts.

The sintered bodies were subjected to a mercury-filling void test and showed the following characteristics.

The total pore volume was 0.097 cc/g, the specific surface area of the total pores was 13.5 m$^2$/g, the mean diameter (based on volume) of the pores was 0.048 $\mu$m and the percentage of void was 66%.

In addition to the above-described method, the inventors carried out another method in which, in place of nitric acid, hydrochloric acid was used for the pH control of the sol from which the gelled green compact was produced. The product from this method showed substantially the same characteristics as the product mentioned as above. Furthermore, when caustic soda was used in place of the concentrated ammonia solution, the product showed generally the same characteristics as the product mentioned as above. However, in this case, the agglomerative structure of the product was somewhat compacted as compared with the above-mentioned product. Furthermore, when the pH of the sol in the second step was controlled at 1.2, the percentage of void of the product was somewhat reduced. However, when the pH of the sol in the second step was controlled a 1.6, the percentage of void of the product was somewhat increased. When the pH of the sol in the third step was controlled 3.0 and 4.0, the dried gelled green compact failed to exhibit satisfied characteristics.

REFERENCES

In order to evaluate the method according to the present invention, the inventors carried out a conventional method. In the conventional method, the steps corresponding to the second and third steps employed in the invention were omitted. That is, the pH lowering and increasing operation for the sol was omitted.

The thin gelled green compacts produced by this conventional method showed the following characteristics.

The total pore volume was 0.092 cc/g, the specific surface area of the total pores was 12.9 m$^2$/g, the mean diameter (based on volume) was 0.08 $\mu$m and the percentage of void was 51%.

However, all of the green compacts were broken when an external force is applied to the same for their curving.

The advantages of the present invention are summarized below.

(1) Since the gelled green compact produced by the invention has a sufficient plasticity, the processability of the same is considerably improved. That is, the green compact can be reshaped readily. In fact, cutting, bending, curving and stamping are usable for shaping the green compact.

(2) Since no organic binder is used, deterioration in quality caused by the binder does not occur.

(3) Since the sintered body produced by the invention has very fine pores (viz., 0.048 $\mu$m in mean diameter), the same is widely applicable to various fields including filter, sensor, catalyst carrier and the like.

What is claimed is:

1. A method for producing a gelled green compact for a thin sintered body, comprising the steps of:
    (a) adding an acid to a solution of metal alkoxide to produce a sol which has a pH of from approximately 2 to approximately 3;
    (b) adding an acid to said sol to lower the pH of said sol;
    (c) adding an alkali to said sol to increase the pH of said sol to within a range from approximately 1.5 to approximately 3;
    (d) drying said sol; and
    (e) molding said sol into the gelled green compact.

2. A method as claimed in claim 1, wherein step (a) further comprises adding a concentrated acid to control the pH of said sol.

3. A method as claimed in claim 2, wherein said acids used in steps (a) and (b) are the same.

4. A method as claimed in claim 3, wherein said acid is nitric acid or hydrochloric acid.

5. A method as claimed in claim 1, wherein said alkali used in the step (c) is an ammonia solution or a caustic soda.

6. A method as claimed in claim 1, wherein step (b) comprises adding said acid until the pH of said sol is lowered to approximately 1.4.

7. A method of producing a thin sintered body, comprising the steps of:
   (a) adding aluminum isopropoxide to isopropyl alcohol so as to keep a total reflux of the alcohol at its boiling point and thereby produce a solution of metal alkoxide;
   (b) adding a solution of nitric acid to said metal alkoxide solution to hydrolyze the aluminum isopropoxide and thereby produce a sol;
   (c) cooling said sol and removing any remaining alcohol therefrom;
   (d) adding concentrated nitric acid to said sol so that said sol has a pH of 2.0;
   (e) adding said concentrated nitric acid to said sol to lower the pH to 1.4;
   (f) adding a concentrated ammonia solution to said sol to raise the pH to 2.0;
   (g) drying said sol;
   (h) molding said sol into a thin gelled green compact; and
   (i) baking said thin gelled green compact.

8. A method as claimed in claim 7, wherein step (a) comprises adding 0.2 mole of said aluminum isopropoxide to 6 mole of said isopropyl alcohol.

9. A method as claimed in claim 8, wherein step (b) comprises adding a solution of nitric acid comprising 20 mole of water and $2.5 \times 10^{-5}$ mole of nitric acid.

10. A method as claimed in claim 9, wherein step (i) is carried out at 1100° C. for 6 hours.

11. A method for producing a gelled green compact for a thin sintered body, comprising the steps of:
   (a) adding an acid to a solution of aluminium alkoxide to produce a sol which has a pH of from approximately 2 to approximately 3;
   (b) adding an acid to said sol to lower the pH of said sol;
   (c) adding an alkali to said sol to increase the pH of said sol to within a range from approximately 1.5 to approximately 3;
   (d) drying said sol; and
   (e) molding said sol into the gelled green compact.

12. A method as claimed in claim 11, wherein step (a) further comprises adding a concentrated acid to control the pH of said sol.

13. A method as claimed in claim 12, wherein said acids used in steps (a) and (b) are the same.

14. A method as claimed in claim 13, wherein said acid is nitric acid or hydrochloric acid.

15. A method as claimed in claim 11, wherein said alkali used in the step (c) is an ammonia solution or a caustic soda.

16. A method as claimed in claim 11, wherein step (b) comprises adding said acid until the pH of said sol is lowered to approximately 1.4.

* * * * *